(12) United States Patent
McKenna et al.

(10) Patent No.: US 6,488,111 B1
(45) Date of Patent: Dec. 3, 2002

(54) HYDRAULIC DRIVE SYSTEM

(75) Inventors: Cathal McKenna, Monaghan; Eric O'Keeffe, Cork; Seamus Murchan, Down, all of (IE)

(73) Assignee: Moffett Research and Development Limited, Dundalk (IE)

( * ) Notice: Subject to any disclaimer, the term of this patent is extended or adjusted under 35 U.S.C. 154(b) by 0 days.

(21) Appl. No.: 09/450,130

(22) Filed: Nov. 26, 1999

(30) Foreign Application Priority Data

Nov. 26, 1998 (IE) ................................................ S980985

(51) Int. Cl.[7] ................................................ B60K 8/00
(52) U.S. Cl. ...................................... 180/308; 180/212
(58) Field of Search .................................. 180/308, 305, 180/212, 215, 65.2, 307, 421, 422, 441, 242, 245; 60/421, 424, 427

(56) References Cited

U.S. PATENT DOCUMENTS

| | | | | |
|---|---|---|---|---|
| 3,742,970 A | * | 7/1973 | Gross | 137/100 |
| 4,548,296 A | * | 10/1985 | Hasegawa | 187/17 |
| 4,766,727 A | * | 8/1988 | Dull | 60/427 |
| 5,199,525 A | * | 4/1993 | Schueler | 180/242 |
| 5,435,135 A | * | 7/1995 | Lallier | 60/425 |
| 5,715,664 A | * | 2/1998 | Sallstrom | 56/7 |
| 6,062,332 A | * | 5/2000 | Stephenson | 180/305 |
| 6,109,384 A | * | 8/2000 | Bromley | 180/242 |
| 6,269,901 B1 | * | 8/2001 | Moffett et al. | 180/308 |
| 6,382,340 B1 | * | 5/2002 | McKenna et al. | 180/308 |

FOREIGN PATENT DOCUMENTS

| | | |
|---|---|---|
| EP | 0816153 | 1/1998 |
| FR | 2719001 | 10/1995 |
| JP | 408127359 A * | 5/1996 |

* cited by examiner

Primary Examiner—Brian L. Johnson
Assistant Examiner—Christopher Bottorff
(74) Attorney, Agent, or Firm—Jacobson Holman PLLC (57) ABSTRACT

A hydraulic drive system for a three-wheeled vehicle with drive assemblies including drive units having a single drive unit with two separate directly coupled drives and a pair of transverse drive units employing respectively separate directly coupled drives. There are hydraulic feed lines for parallel operation and for series operation, a secondary hydraulic feedline between the drive units and a secondary hydraulic feed line between the drive units and a hydraulic controller controls diverter valves for parallel and series operation. The hydraulic drive includes a steering system which senses out of line travel.

52 Claims, 4 Drawing Sheets

HYDRAULIC DRIVE SYSTEM

BACKGROUND OF THE INVENTION

1. Field of the Invention

The present invention relates to an hydraulic drive system for a vehicle of the type having three independent wheel drive shaft assemblies in an essentially triangular configuration, namely a transversely arranged pair of wheel drive shaft assemblies and a single wheel drive shaft assembly longitudinally spaced from the transversely arranged pair. The drive system comprises an hydraulic pump and associated oil supply sump and a drive unit directly coupled to each of the drive shaft assemblies so that the drive units can be distinguished from each other, the drive unit connected to the single wheel drive shaft assembly is hereinafter called the "single" drive unit and each drive unit connected to one of the transversely arranged pair of wheel drive assemblies is called a "transverse" drive unit. Each drive unit comprises at least two separate drives directly coupled to each drive shaft assembly, each drive unit having a separate hydraulic input and output and hydraulic feed lines for parallel operation and includes for series operation secondary hydraulic feed lines one between one of the drive units of the single drive unit and one of the drive units of one of the transverse drive units and the other between the other drive of the single drive unit and one of the drive units of the other transverse drive unit. The drive system further comprises a hydraulic drive controller, which controller comprises a diverter valve connected to each secondary hydraulic feed line and across each of the said drive units of the transverse drive units to provide parallel and series operation. It also relates to a steering system for such an hydraulic drive system.

2. Background Information

In European Patent Specification No. EP0816153 there is claimed a hydraulics drive system for a vehicle, having three independent wheel drive shaft assemblies in an essentially triangular configuration, namely a transversely arranged pair of wheel drive shaft assemblies and a single wheel drive shaft assembly longitudinally spaced from the transversely arranged pair. The drive system comprises a hydraulic pump and a drive unit directly coupled to each of the drive shaft assemblies again referred to as a single drive unit and a pair of transverse drive units. Each drive unit comprises at least two separate drives directly coupled to each drive shaft assembly. Each drive has a separate hydraulic input and output. Valving is provided to feed hydraulic fluid to each drive unit whereby the drive units operate in series or in parallel.

This is a particularly satisfactory method of operating the hydraulic drive system in that in almost all situations it eliminates the difficulties of skidding, wheel spin and the like because when using a series arrangement all the time a simple and effective drive system is provided. This is particularly effective for three-wheeled vehicles and for three wheeled vehicles of a relatively short wheel base. A problem arises when it becomes necessary to turn the vehicle when the drives are operating in series. This is usually achieved by the simple expedient of converting the drive to parallel operation. This causes problems of wheel spin, loss of traction and cavitation and these problems are discussed in more detail below.

Previous attempts have been made to overcome the problems of the operation of three-wheeled vehicles such as, for example, by the use of an hydraulic drive system as described in French Patent Specification No. 2719001 (E.C.B. SARL). This patent specification acknowledges the need for safety reasons to ensure that the wheels are all synchronised and that if the distributional load is, for example, equally distributed over the three wheels, the hydraulic transmission operates relatively well but that on slopes and, indeed, in difficult terrain it can become dangerous to operate the vehicle. Further, this patent specification discloses the problems with the prior art in the use of flow dividers, electronic distributors and the like. This patent specification proposes an arrangement somewhat similar to that described in European Patent Specification No. 0816153, however, unfortunately a very elaborate desynchronisation unit is provided comprising an electro-distributor which allows the flow of oil between the drives. If, with the electro-distributor shut, any of the wheels are locked or stopped for any reason with another wheel turning, excessive oil pressure can build up.

In this latter patent specification there is provided a hydraulic transmission which provides permanent synchronisation and then total de-synchronisation on negotiating a corner by transferring oil between the transverse drive assemblies. Unfortunately, in certain conditions particularly in poor terrain there may not be sufficient drive imparted to the outer wheels of the transverse drive assembly to negotiate the bend. Thus, certain problems have arisen in connection with the operation of a vehicle with an hydraulic drive system in accordance with the invention described and claimed in this European Patent Specification No. EP 0816153 in the sense that it must always be appreciated that situations will arise, particularly when working in difficult terrain, when one of the wheels for example is stopped or turning more slowly than the others. While this does not generally happen due to the arrangement there are always situations when it may. This has unfortunately caused certain problems in operation.

OBJECTS

The invention is directed towards providing efficient steering without undue tyre wear and therefore a hydraulic drive system which operates satisfactorily as the vehicle is steered out of in-line travel such as around corners.

SUMMARY OF THE INVENTION

According to the invention there is provided a steering system for an hydraulic drive system for a vehicle of the type having three independent wheel drive shaft assemblies in an essentially triangular configuration, namely a transversely arranged pair of wheel drive shaft assemblies and a single wheel drive shaft assembly longitudinally spaced from the in-line pair. The drive system comprises an hydraulic pump and associated oil supply sump and a drive unit directly coupled to each of the drive shaft assemblies. So that the drive units can be distinguished from each other, the drive unit connected to the single wheel drive shaft assembly is hereinafter called the "single" drive unit and each drive unit connected to one of the transversely arranged pair of wheel drive assemblies is called a "transverse" drive unit. Each drive unit comprises at least two separate drives directly coupled to each drive shaft assembly. Each drive has a separate hydraulic input and output and hydraulic feed lines for parallel operation and includes for series operation secondary hydraulic feed lines one between one of the drive units of the single drive unit and one of the drive units of one of the transverse drive units and the other between the other drive of the single drive unit and one of the drive units of the other transverse drive unit. The drive system further comprises a hydraulic drive controller, which controller comprises a diverter valve connected to each secondary hydraulic feed line and across each of the said drive units of the transverse drive units to provide parallel and series operation. The essential feature of the hydraulic drive system is that it comprises a steering control system including means for detecting movement of the vehicle from in-line travel so that on the vehicle moving out of in-line travel and steering around a particular transverse drive assembly, the single drive unit operates in parallel with that transverse drive unit and in series with the other transverse drive unit.

In normal operation when the drives are operating in series this overcomes the problem of turning without switching the whole vehicle to parallel operation. Thus good traction will be maintained even when turning in slippery conditions, in that the vehicle now has the benefits of parallel operation with the drive going round the turn as it were and series operation and thus increased traction with the outer of the two drives on the outer wheels. Similarly if operating in parallel the invention gives increased traction for turning when it is required by switching to series operation on the outer wheels.

Ideally the hydraulic drive system incorporates a steering mechanism connected to the single drive shaft assembly for steering by pivoting the single drive shaft assembly. This is a particularly useful way of providing the steering system as it ensures optimum control.

Generally speaking in such a system the steering mechanism includes a substantially vertically arranged steering shaft mounting the single drive shaft assembly.

Ideally the means for detecting movement of the vehicle out of in-line travel includes pivot sensing means for the steering shaft. These are just particularly suitable ways of providing the present invention.

In one embodiment of the Invention the pivot sensing means comprises a pair of electrical switches each connected to a relay for operation of one of the diverter valves and a switch actuator for each switch operable on pivoting of the single wheel drive shaft assembly into a turning mode. Such a type as which is relatively easy to provide is robust and is relatively sensitive in use.

Ideally there is a time delay on the operation of the diverter valves on detecting movement of the vehicle out of in-line travel. This ensures that the diverter valves open gradually on detecting movement of the single drive shaft assembly out of in-line travel. By providing a time delay there is time to transfer from series to parallel operation on the turning and this ensures that the ride is smooth and that the change over does not cause wheel spin or wear.

Ideally to provide the necessary delay, the diverter valves deliver the hydraulic fluid through flow restrictors, which flow restrictors are preferably orifices mounted in a fluid line fed by the diverter valve. This has been found to be a particularly easy way of providing the necessary delays which can be anything between 0.5 and 3 seconds but is ideally of the order of 1 second between detecting movements of the vehicle out of in-line travel and the full operation of the diverter valve. We found in practice that the one second delay is sufficient to give a gentle transfer from series to parallel operation.

Positive displacement piston valves have been found as being particularly suitable for diverter valves and it has also been found preferable to have a pressure release valve in each secondary hydraulic feed line so as there can be no rotation particularly when turning.

BRIEF DESCRIPTION OF THE DRAWINGS

Other features and advantages of the invention will be apparent from. The following description taken in connection with the accompanying drawings, wherein.

DESCRIPTION OF THE PREFERRED EMBODIMENT

Figure 1:
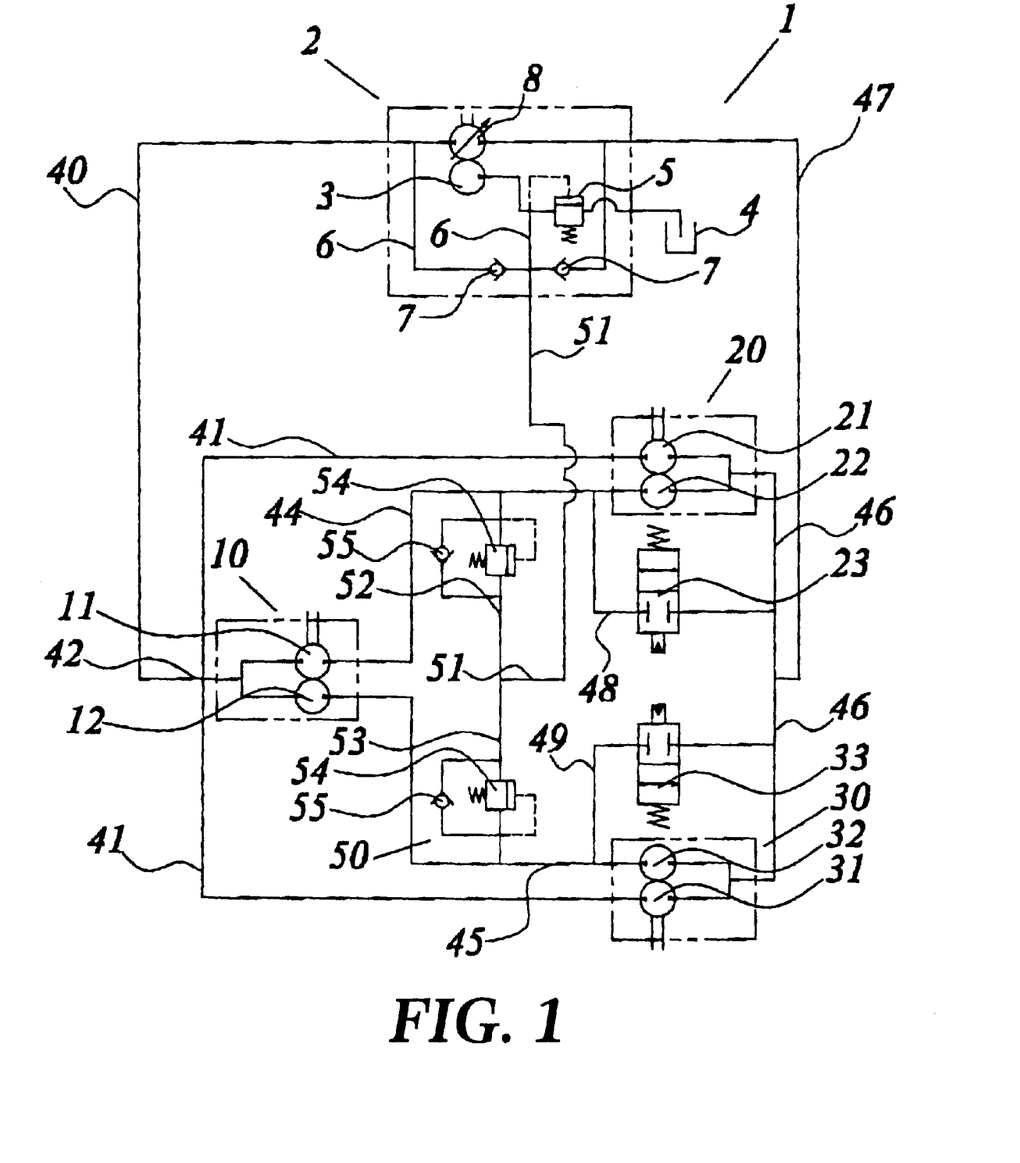
FIG. 1 is a diagrammatic representation of portion of a hydraulic drive system.

Referring to the drawings, there is illustrated a hydraulic drive system, indicated generally by the reference numeral 1 comprising a hydraulic pump assembly 2, a single drive unit indicated generally by the reference numeral and a pair of transverse drive units 20 and 30 respectively. Each of the drive units 10, 20 and 30 is individually coupled directly to a shaft forming a drive shaft assembly. The drive shaft assemblies are conventional and are not illustrated. For a forklift truck of the "piggy back" type, the drive units 10, 20 and 30 each comprise two separate mechanically linked drives 11 and 12; 21 and 22; and 31 and 32 respectively. The hydraulic pump assembly comprises a pump 8 and therewith in conventional manner a booster pump 3 and associated dump oil sump 4 fed through a charge relief valve 5. The booster pump 3 is connected by a by-pass hydraulic fluid line 6 to a pair of conventional anti-cavitation non-return valves 7.

Before the various pipes and connections are described in more detail, the significance of the terms "input" and "output" has to be appreciated. As used in this specification, they are interchangeable in that what is the input when the vehicle is travelling forward becomes the output when the vehicle is travelling in reverse. Thus, the term input and output is used for one direction of flow of the pump which is presumed to drive the vehicle to which the hydraulic drive system is attached forward. Further, none of the pipes or line connections have been described in detail and standard connectors, valves etc. are ignored but will now be described below, the minimum number of reference numerals being used for clarity.

Similarly, the term "3 wheeled" covers not just three separate wheels in triangular configuration but any number of individual wheels forming three sets of wheels. Feed or return piping or conduit for hydraulic oil which is more usually but not exclusively the actuation fluid is usually referred to simply as "hydraulic feed" or "feed" or "feed lines" or fluid lines.

The hydraulic pump 8 feeds the drives 11 and 12 through primary hydraulic fluid lines 40 and 42 as well as the drives 21 and 31 through primary hydraulic fluid lines 41. The output of the drive 11 is fed directly by the secondary fluid line 44 to the drive 22 of the transverse drive unit 20 and the output of the drive 12 is fed directly through a secondary fluid line 45 to the drive 32 of the transverse drive unit 30. Outputs of each of the drives 21, 22, 31 and 32 are fed through return hydraulic fluid lines 46 and 47 back to the input of the pump 2. On/off diverter valves 23 and 33 are mounted in by-pass hydraulic lines 48 and 49 between the secondary fluid lines 44 and 45 respectively and the return hydraulic lines 46 and 47. A steering system forms part of the hydraulic drive system which utilises the diverter valves 23 and 33; the steering system is described later.

A hydraulic drive controller is identified generally by the reference numeral 50 and comprises a hydraulic line 51 connected to hydraulic lines 52 and 53 respectively connected to the secondary fluid lines 44 and 45. Mounted in each line 52 and 53 is, in parallel, a pressure relief valve 54 and a non-return valve 55. The hydraulic line 51 is connected directly to the by-pass hydraulic fluid line 6.

In operation, with the diverter valves 23 and 33 shut, the drives 11 and 12 are in series with the drives 22 and 32 respectively and thus the three drive units 10, 20 and 30 operate in series. Accordingly, in the drive assemblies, wheel spin is prevented or more strictly potential wheel spin is nullified.

When the diverter valves 23 and 33 are opened, hydraulic fluid by-passes the drives 22 and 32 respectively and thus the hydraulic drive system operates in parallel, as the drives 21 and 31 as well as the drives 11 and 12 are all fed directly from the hydraulic pump 2 and return directly to it. This is particularly suitable for off site travel or when the terrain is not difficult.

In operation, if there is excess pressure in either of the secondary fluid lines 44 and 45, hydraulic fluid will be delivered through a pressure relief valve 54, into the lines 52 or 53, 51 and 6 through the charge relief valve 5 to the dump oil sump 4. Similarly, if cavitation is likely to occur, the non-return valves 55 ensure that oil will be delivered from the booster pump 3 in the reverse direction.

Figure 2:
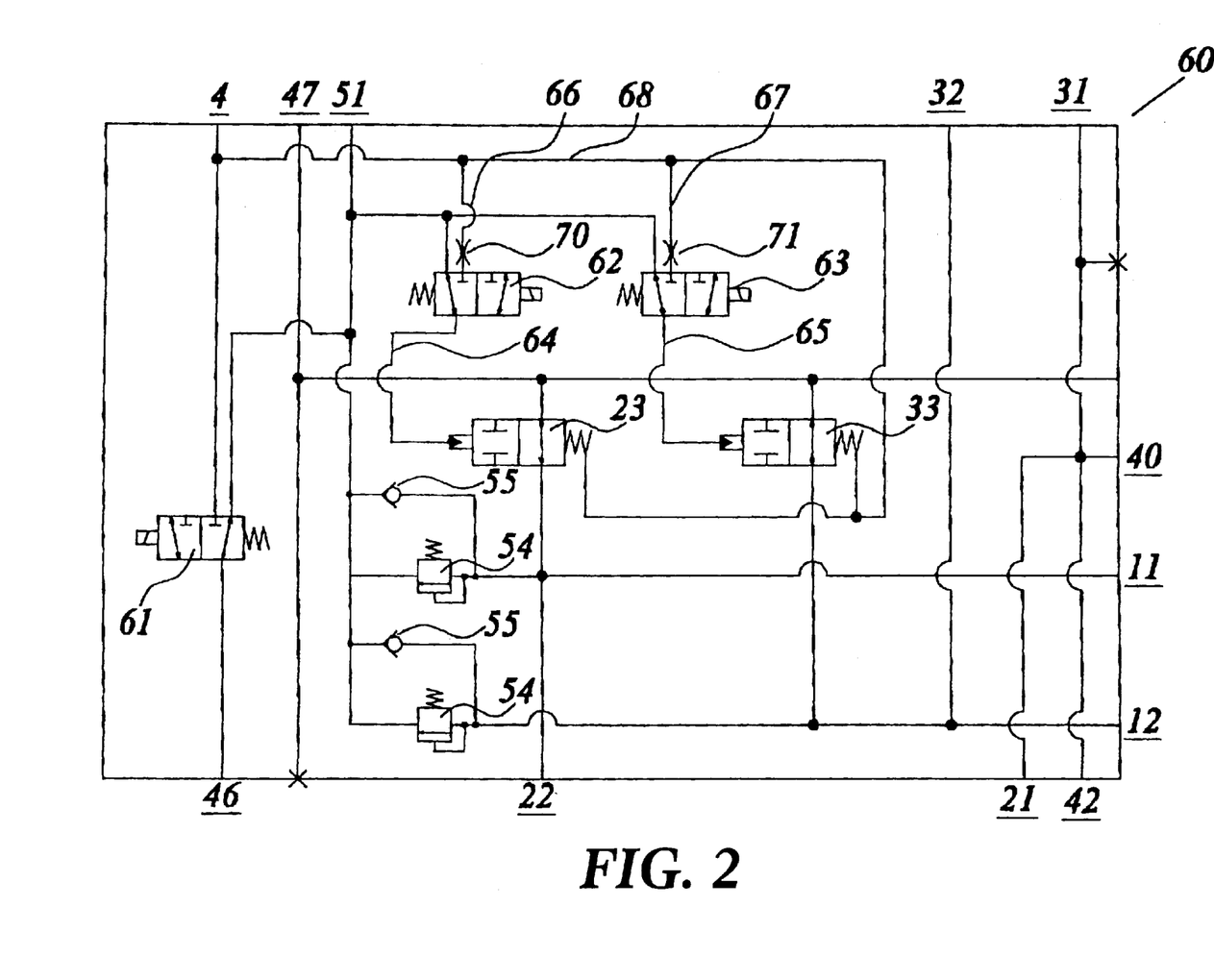
FIG. 2 is a diagrammatic view of a manifold block used in the invention.

Referring now to FIG. 2, there is illustrated a manifold block indicated generally by the reference numeral 60 of substantially conventional construction incorporating many of the valves used in the invention. The same reference numerals are used to identify the same valves within the block 60 as were hereinbefore described. The connection ports for hydraulic lines or to the oil sump 4 are identified by underlined reference numerals. The full lines all identify hydraulic oil or feedline connections many of which are not identified by reference numerals. There is included in the manifold block 60 a conventional brake valve 61 feeding a brake port identified by the underlined reference number 61. Each diverter valve 23 and 33 is a piston type valve kept normally shut by control valves 62 and 63 respectively. Each control valve 62 and 63 is a solenoid operated spool valve feeding oil in one position directly from the hydraulic line 51 to the diverter valves 23 and 33 through hydraulic feed lines 64 and 65 respectively. In the other position, the control valves 62 and 63 connect the hydraulic feed lines 64 and 65 through further hydraulic feed lines 66 and 67 respectively and 68 to the oil sump 4. A flow restrictor in the form of orifices 70 and 71 in the hydraulic feed lines 66 and 67 respectively are provided. In this embodiment, the diverter valves 23 and 33 are positive displacement piston valves of conventional construction.

Figure 3:
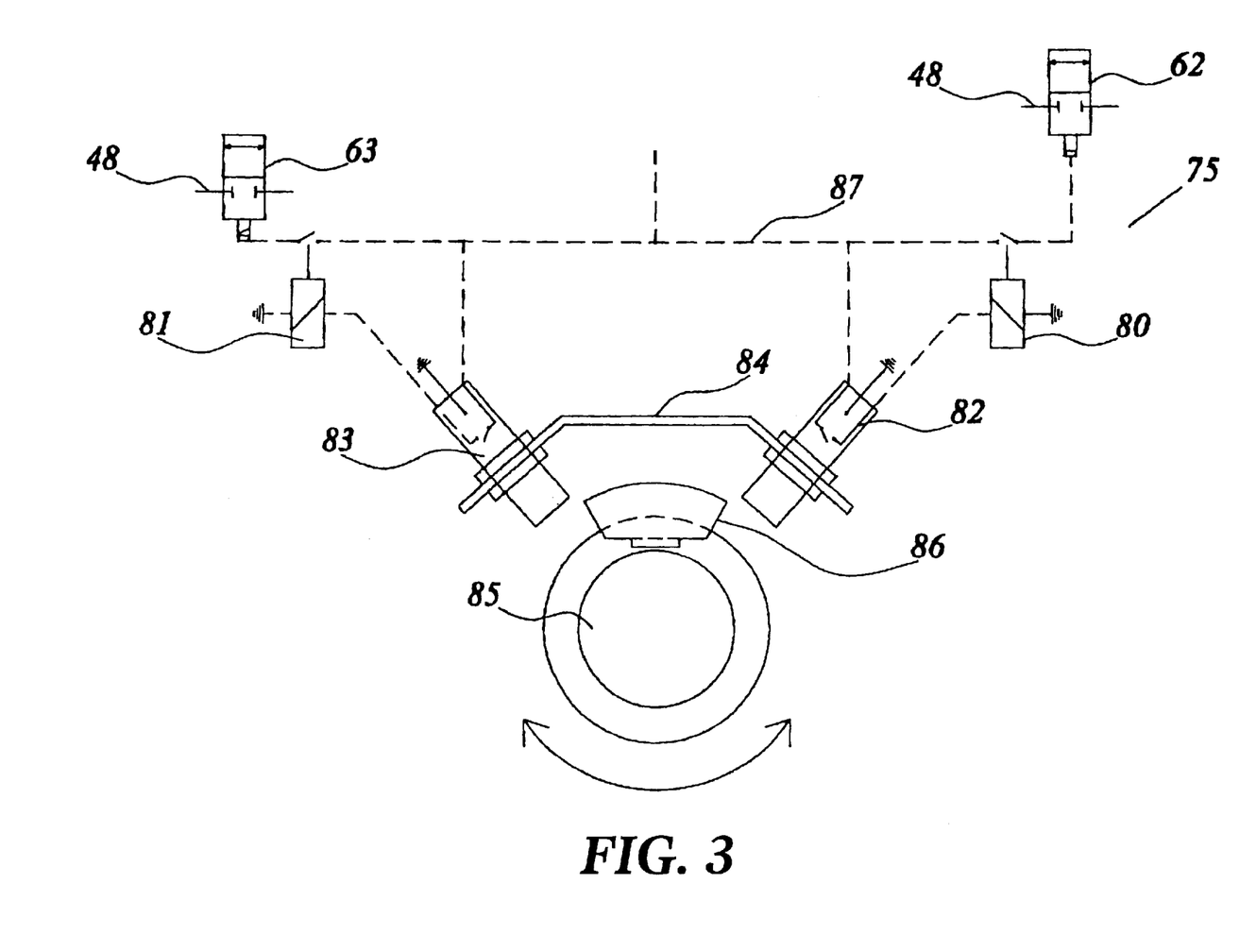
FIG. 3 is a detail of part of the circuit forming the steering control system of the hydraulic drive system.

Referring to FIG. 3, there is illustrated portion of the steering control system, indicated generally by the reference numeral 75, which operates the control valves 62 and 63. Each valve 62 and 63 is connected through relays 80 and 81 respectively to switches 82 and 83 which are mounted on a support 84 adjacent a steering shaft 85 on which the single drive unit 10 would be mounted. The steering shaft 85 has mounted thereon a sensing bracket 86 associated with the switches 82 and 83. The switches 82 and 83 in conjunction with the sensing bracket 86 will sense which way the steering axle 85 is being turned and hence which way the single drive unit 10 is turning about one or other of the transverse drive units 20 and 30. Electrical wiring is identified by the reference numeral 87 and interrupted lines.

Figure 4:
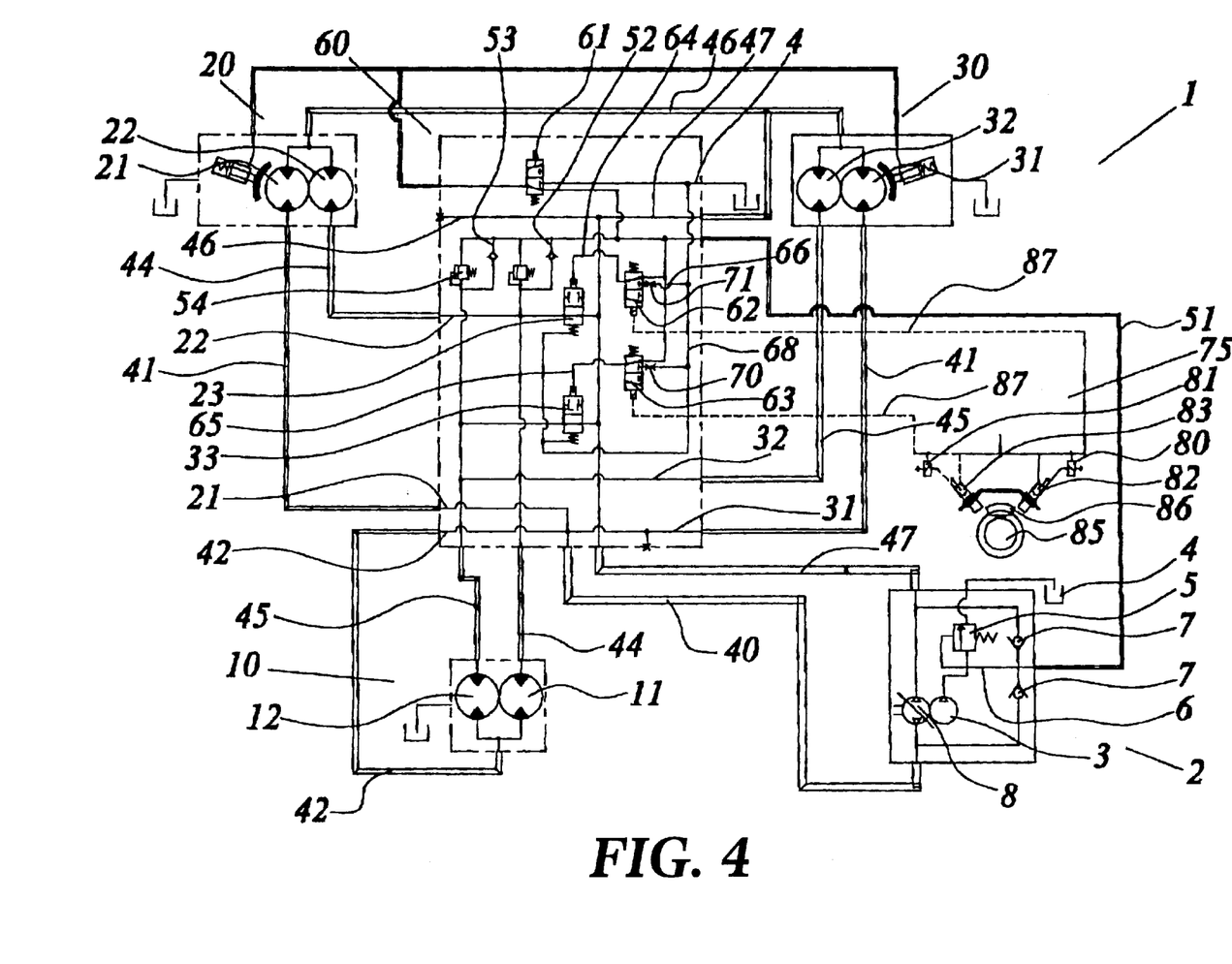
FIG. 4 is an overall schematic view of the hydraulic drive system.

FIG. 4 shows the layout with the manifold block 60, the pump assembly 2 and the steering control system 75 and drive units 10, 20 and 30 shown by interrupted lines. Pipes are shown between these units by double lines. The electrical wiring is again shown by interrupted lines and while the steering control system 75 is in practice physically located above the drive unit 10 it is here shown apart.

Firstly, when operating in series and driving in a straight line, both diverter valves 23 and 33 are closed. When a turn is made, for example, turning about the transverse drive assembly, including the transverse drive unit 20 the diverter valve 23 is opened. With the diverter valve 23 opened, the single drive unit 11 and the transverse drive unit 22 operate in parallel while the single drive unit 10 and the transverse drive unit 32 operate in series. When a right-hand turn is made, only the diverter valve 33 will open.

In operation, the diverter valves 22 and 23 are normally closed with pressurised hydraulic fluid being applied to them through the control valves 62 and 63 through the hydraulic feed lines 64 and 65 respectively from the hydraulic line 51. When the solenoids of the control valves 62 and 63 are activated, the hydraulic connection is broken and the hydraulic fluid in the diverter valves 23 and 33 leaks through the orifices 70 and 71 so that the diverter valves 23 and 33 open fully after a time delay, of the order of 0.5 to 2.0 seconds, usually 1.0 seconds. Thus, there is a gentle transfer from series to parallel operation.

An override switch will often be provided to ensure that the drive operates totally in parallel. Again there is no need to illustrate this. In this situation when the diverter valves 23 and 33 are both open, that is to say when the three drive units 10, 20 and 30 are operating in parallel, and, for example, the three wheel vehicle is turned to the left, the diverter valve 23 will remain open and the diverter valve 33 will close. Then the single drive unit or rear motor is, as it usually will be, in series operation with one of the wheels and in parallel operation with the other. Generally, the system will not continuously operate in parallel when the operating conditions are difficult.

In parallel operation, it is easy to appreciate how cavitation will occur if one of the pair of transverse drive units 20 and 30 can spin independently of the other two. For example, if only the transverse drive unit 20 is operating and the transverse drive units 10 and 30 are not rotating, all the oil will be delivered to the transverse drive unit 20 to the drive 21 which is mechanically linked to the drive 22 which will now, because the drive 21 is rotating and it is rotating with it, will require the same amount of oil as the drive 21. The booster pump 3, because the valve 23 is open, cannot deliver sufficient oil to the drive 22 and cavitation will occur. Thus, if a vehicle makes a turn in slippery conditions, the wheel with the most traction is the inside wheel of the turning radius. This means that wheel spin is likelier to occur on the other front wheel making cavitation common.

The possibility of one wheel spinning on its own is now limited and, for example, the problem when operating, in series, of the motor on the inside of the turning radius over speeding and causing tyre wear is eliminated. For example, in parallel mode, it will be appreciated that the single drive unit or rear motor has twice as much power as the two transverse drive units or front motors. This extra power to the single drive unit causes excess wheel spin and results in tyre wear problems even on relatively good surfaces. With the automatic switching system according to the present invention, since the single drive unit is always in series with one or other or both of the transverse drive units, the single drive unit can only spin if the drive unit to which it is coupled, in series with it, is spinning and this can only happen when the machine is suspended off the ground.

Further, the present invention eliminates the problem with series operation in that it is very difficult to turn without switching to parallel operation. In parallel operation, traction is very poor, particularly in slippery conditions. Thus again, when turning in series operation, it can be difficult as traction is lost if it changes to parallel operation. This again has been overcome by the present invention in that good traction will be maintained even when turning in relatively slippery conditions as one is able to continue to have the series operation while obtaining the benefits of parallel operation.

It will be appreciated that reversing the hydraulic pump causes the hydraulic drive system to operate in reverse in the same manner as in the forward direction.

While the embodiments described above describe a particular steering mechanism operating in conjunction with the single drive assembly the invention could equally well be applied to a steering mechanism used with the transversely arranged in-line pair of wheel drive shaft assemblies.

While the drives have been shown as separate drives, they would each normally be formed from the one hydraulic motor having two individual cylinders. The motor would generally have two separate inputs and the one linked output.

Generally, each hydraulic motor comprises a plurality of cylinders having pistons: a pair of input ports and a separate supply line connecting each input port with a number of cylinders. In such an arrangement, there is also usually the one output port and a return line connecting all the cylinders to the output port. The cylinders are generally of the same capacity and thus the torque can be varied by deciding how many cylinders will be connected to each input port. It is possible to have any arrangement of torque's and speed though generally speaking the pumps are often divided into two separate drives of the same capacity.

The terms "include", "includes", "included", "including" and the terms "comprise", "comprises", "comprised" and "comprising" are used interchangeably in this specification and are to be afforded the widest possible interpretation.

The invention is not limited to the embodiments hereinbefore described which may be varied in both construction and detail within the scope of the claims.

What is claimed is:

1. An hydraulic drive system for a vehicle having three independent wheel drive shaft assemblies in an essentially triangular configuration, namely a transversely arranged pair of drive shaft assemblies and a single wheel drive shaft assembly longitudinally spaced from the transversely arranged pair of drive shaft assemblies, the hydraulic drive system comprising:

a hydraulic pump;

three drive units, a first being a single drive unit and a second and a third being transverse drive units, each comprising a plurality of mechanically coupled hydraulically operated drives;

a hydraulic input for each drive;

a hydraulic output for each drive;

the single drive unit forming part of the single wheel drive shaft assembly;

each of the second and third transverse drive units forming part of one of the transversely arranged drive shaft assemblies;

a primary hydraulic fluid line connecting the hydraulic pump to the input of each drive of the single drive unit and to one of the drives of each of the transverse drive units;

a secondary fluid line connecting the output of the drive of one of the single drive units separately to the unconnected input of the drive of one of the transverse drive units;

a further secondary fluid line connecting the output of the drive of the other single drive unit separately to the unconnected input of the drive of the other transverse drive unit;

a return hydraulic fluid line connecting the output of each drive of the transverse drive units to the hydraulic pump;

by-pass hydraulic fluid lines each connecting across each secondary hydraulic fluid line and the return hydraulic fluid lines;

an on/off diverter valve mounted in each by-pass hydraulic fluid line, the diverter valve in the closed position causing the drive units connected by the secondary fluid line to operate in series;

means for detecting movement of the vehicle out of in line travel; and means for operating the on/off diverter valves over a predetermined delay to cause the drive of the single drive shaft assembly connected to the drive of the transverse drive unit to operate in parallel therewith upon the vehicle turning and to cause the other drive of the single drive shaft assembly to operate in series with the other transverse drive unit.

2. An hydraulic drive system as claimed in claim 1 in which there is a time delay on the operation of the diverter valves on detecting movement of the vehicle out of in-line travel.

3. An hydraulic drive system as claimed in claim 1 in which the diverter valves open gradually on detecting movement of the vehicle out of in-line travel by detecting the single drive shaft assembly out of in-line travel.

4. A hydraulic drive system as claimed in claim 1 in which the diverter valves deliver hydraulic fluid through flow-restrictors.

5. An hydraulic drive system as claimed in claim 1 in which the diverter valves deliver hydraulic fluid through flow restrictors having orifices mounted in a fluid line fed by the diverter valve.

6. An hydraulic drive system as claimed in claim 1 in which there is a time delay of between 0.5 and 3.0 seconds between detecting of movement of the vehicle out of in-line travel and the full operation of the diverter valves.

7. An hydraulic drive system as claimed in claim 6 in which the time delay is approximately 1.0 seconds.

8. An hydraulic drive system as claimed in claim 1 in which the diverter valves are positive displacement piston valves.

9. An hydraulic drive system as claimed in claim 1 for which a pressure release valve is provided in each secondary hydraulic feed line.

10. An hydraulic drive system as claimed in claim 1 in which the steering system incorporates a steering mechanism connected to the single drive shaft assembly for steering by pivoting the single drive shaft assembly.

11. An hydraulic drive system as claimed in claim 10 in which the steering mechanism includes a substantially vertically arranged steering shaft mounting the single drive shaft assembly.

12. An hydraulic drive system as claimed in claim 10 in which the steering mechanism includes a substantially vertically arranged steering shaft mounting the single drive shaft assembly and in which the means for detecting movement of the vehicle out of in-line travel includes pivot sensing means for the steering shaft.

13. An hydraulic drive system as claimed in claim 10 in which the steering mechanism includes a substantially vertically arranged steering shaft mounting the single drive shaft assembly and in which the means for detecting movement of the vehicle out of in-line travel includes pivot sensing means for the steering shaft and in which the pivot sensing means comprises a pair of electrical switches each connected to a relay for operation of one of the diverter valves and a switch actuator for each switch operable on pivoting of the single wheel drive shaft assembly into a turning mode.

14. An hydraulic drive system as claimed in claim 10 in which there is a time delay on the operation of the diverter valves on detecting movement of the vehicle out of in-line travel.

15. An hydraulic drive system as claimed in claim 10 in which the diverter valves open gradually on detecting revolving of the single drive shaft assembly for out of in-line travel.

16. An hydraulic drive system as claimed in claim 10 in which the diverter valves deliver the hydraulic fluid through flow-restrictors.

17. An hydraulic drive system as claimed in claim 10 in which the diverter valves deliver the hydraulic fluid through flow restrictors having orifices mounted in a fluid line fed by the diverter valve.

18. An hydraulic drive system as claimed in claim 10 in which there is a time delay of between 0.5 and 3.0 seconds between detecting of movement of the vehicle but of in-line travel and the full operation of the diverter values.

19. An hydraulic drive system as claimed in claim 18 in which the time delay is approximately 1.0 seconds.

20. An hydraulic drive system as claimed in claim 10 in which the diverter valves are positive displacement piston valves.

21. An hydraulic drive system as claimed in claim 10 for which a pressure release valve is provided in each secondary hydraulic feed line.

22. An hydraulic drive system for a vehicle having three independent wheel drive shaft assemblies in an essentially triangular configuration, namely a transversely arranged pair of drive shaft assemblies and a single wheel drive shaft assembly longitudinally spaced from the transversely arranged pair of drive shaft assemblies, the hydraulic drive system comprising:

a hydraulic pump;
three drive units, a first being a single drive unit and a second and a third being transverse drive units, each comprising a plurality of mechanically coupled hydraulically operated drives;
a hydraulic input for each drive;
a hydraulic output for each drive;
the single drive forming part of the single wheel drive shaft assembly;
each of the second and third transverse drive units forming part of one transversely arranged drive shaft assemblies;
a primary hydraulic fluid line connecting the hydraulic pump to the input of each drive of the single drive unit and to one of the drives of each of the transverse drive units;
a secondary fluid line connecting the output of the drive of one of the single drive units separately to the unconnected input of the drive of one of the transverse drive units;
a further secondary fluid line connecting the output of the drive of the other single drive unit separately to the unconnected input of the drive of the other transverse drive unit;
a return hydraulic fluid line connecting the output of each drive of the transverse drive units to the hydraulic pump;
by-pass hydraulic fluid lines each connecting across each secondary hydraulic fluid line and the return hydraulic fluid lines;
an on/off diverter valve mounted in each by-pass hydraulic fluid line, the diverter valve in the closed position causing the drive units connected by the secondary fluid line to operate in series;
a substantially vertically arranged steering shaft mounting the single drive shaft;
means for pivoting the single drive shaft assembly and pivot sensing means for detecting movement of the steering shaft and hence movement of the vehicle out of in-line travel;
means for operating the on/off diverter valves over a predetermined delay to cause the drive of the single drive shaft assembly connected to the drive of the transverse drive unit to operate in parallel therewith upon the vehicle turning and to cause the other drive of the single drive shaft assembly to operate in series with the other transverse drive unit.

23. An hydraulic drive system as claimed in claim 22 in which the steering mechanism includes a substantially vertically arranged steering shaft mounting the single drive shaft assembly and in which the means for detecting movement of the vehicle out of in-line travel includes pivot sensing means for the steering shaft and in which the pivot sensing means comprises a pair of electrical switches each connected to a relay for operation of one of the diverter valves and a switch actuator for each switch operable on pivoting of the single wheel drive shaft assembly into a turning mode.

24. An hydraulic drive system as claimed in claim 22 in which there is a time delay on the operation of the diverter valves on detecting movement of the vehicle out of in-line travel.

25. An hydraulic drive system as claimed in claim 22 in which the diverter valves open gradually on detecting movement of the single drive shaft assembly out of in-line travel.

26. An hydraulic drive system as claimed in claim 22 in which the diverter valves deliver hydraulic fluid through flow-restrictors.

27. An hydraulic drive system as claimed in claim 22 in which the diverter valves deliver hydraulic fluid through flow restrictors having orifices mounted in a fluid line fed by the diverter valve.

28. An hydraulic drive system as claimed in claim 22 in which there is a time delay of between 0.5 and 3.0 seconds between detecting of movement of the vehicle but of In-line travel and the full operation of the diverter values.

29. An hydraulic drive system as claimed in claim 28 in which the time delay is approximately 1.0 seconds.

30. An hydraulic drive system as claimed in claim 22 in which the diverter valves are positive displacement piston valves.

31. An hydraulic drive system as claimed in claim 22 for which a pressure release valve is provided in each secondary hydraulic feed line.

32. An hydraulic drive system for a vehicle having three independent wheel drive shaft assemblies in an essentially triangular configuration, namely a transversely in-line pair of drive shaft assemblies and a single wheel drive shaft assembly longitudinally spaced from the transversely arranged pair of drive shaft assemblies, the hydraulic device system comprising:

a hydraulic pump;

three drive units, a first being a single drive unit and a second and a third being transverse drive units, units each comprising two mechanically coupled hydraulically operated drives;

a hydraulic input for each drive;

a hydraulic output for each drive;

the single drive unit forming part of the single wheel drive shaft assembly;

each of the second and third transverse drive units forming part of one of the transversely arranged drive shaft assemblies;

a primary hydraulic fluid line connecting the hydraulic pump to the input of each drive of the single drive unit and to one of the drives of each of the transverse drive units;

a secondary fluid line connecting the output of the drive of one of the single drive units separately to the unconnected input of the drive of one of the transverse drive units;

a further secondary fluid line connecting the remaining output of the drive of the other single drive unit separately to the unconnected input of the drive of the other transverse drive unit;

a return hydraulic fluid line connecting the output of each drive of the transverse drive units to the hydraulic pump;

by-pass hydraulic fluid lines each connecting across each secondary hydraulic fluid line and the return hydraulic fluid lines;

an on/off diverter valve mounted in each by-pass hydraulic fluid line, the diverter valve in the closed position causing the drive units connected by the secondary fluid line to operate in series;

a substantially vertically arranged steering shaft mounting the single drive shaft;

means for pivoting the single drive shaft assembly and pivot sensing means for detecting movement of the steering shaft and hence movement of the vehicle out of in-line travel;

means for operating the on/off diverter valves over a predetermined delay to cause the drive of the single drive shaft assembly connected to the drive of the transverse drive unit to operate in parallel therewith upon the vehicle turning and to cause the other drive of the single drive shaft assembly to operate in series with the other transverse drive unit.

33. An hydraulic drive system as claimed in claim 32 in which the steering mechanism includes a substantially vertically arranged steering shaft mounting the single drive shaft assembly and in which the means for detecting movement of the vehicle out of in-line travel includes pivot sensing means for the steering shaft and in which the pivot sensing means comprises a pair of electrical switches each connected to a relay for operation of one of the diverter valves and a switch actuator for each switch operable on pivoting of the single wheel drive shaft assembly into a turning mode.

34. An hydraulic drive system as claimed in claim 32 in which there is a time delay on the operation of the diverter valves on detecting movement of the vehicle out of in-line travel.

35. An hydraulic drive system as claimed in claim 32 in which the diverter valves open gradually on detecting movement of the single drive shaft assembly out of in-line travel.

36. An hydraulic drive system as claimed in claim 32 in which the diverter valves deliver the hydraulic fluid through flow-restrictors.

37. An hydraulic drive system as claimed in claim 32 in which the diverter valves deliver the hydraulic fluid through flow restrictors having orifices mounted in a fluid line fed by the diverter valve.

38. An hydraulic drive system as claimed in claim 32 in which there is a time delay of between 0.5 and 3.0 seconds between detecting of movement of the vehicle but of in-line travel and the full operation of the diverter values.

39. An hydraulic drive system as claimed in claim 38 in which the time delay is approximately 1.0 seconds.

40. A steering system for a vehicle having three independent wheel drive shaft assemblies in an essentially triangular configuration, namely a transversely arranged pair of drive shaft assemblies and a single wheel drive shaft assembly longitudinally spaced from the transversely arranged pair of drive shaft assemblies and having a hydraulic drive system, the steering system comprising:

a hydraulic pump;

three drive units, a first being a single drive unit and a second and a third being transverse drive units, each comprising a plurality of mechanically coupled hydraulically operated drives;

a hydraulic input for each drive;

a hydraulic output for each drive;

the single drive unit forming part of the single wheel drive shaft assembly;

each of the second and third transverse drive units namely transverse drive units forming part of one of the transversely arranged drive shaft assemblies;

a primary hydraulic fluid line connecting the hydraulic pump to the input of each drive of the single drive unit and to one of the drives of each of the transverse drive units;

a secondary fluid line connecting the output of the drive of one of the single drive units separately to the unconnected input of the drive of one of the transverse drive units;

a further secondary fluid line connecting the output of the drive of the other single drive unit separately to the unconnected input of the drive of the other transverse drive unit;

a return hydraulic fluid line connecting the output of each drive of the transverse drive units to the hydraulic pump;

by-pass hydraulic fluid lines each connecting across each secondary hydraulic fluid line and the return hydraulic fluid lines; and an on/off diverter valve mounted in each by-pass hydraulic fluid line, the diverter valve in the closed position causing the drive units connected by the secondary fluid line to operate in series, wherein the steering system comprises;

means for detecting movement of the vehicle out of in-line travel; and means for operating the on/off diverter valves over a predetermined delay to cause the drive of the single drive shaft assembly connected to the drive of the transverse drive unit to operate in parallel therewith upon the vehicle turning and to cause the other drive of the single drive shaft assembly to operate in series with the other transverse drive unit.

41. A steering system as claimed in claim 40 in which the steering system incorporates a steering mechanism connected to the single drive shaft assembly for steering by pivoting the single drive shaft assembly.

42. A steering system as claimed in claim 40 in which the steering mechanism includes a substantially vertically arranged steering shaft mounting the single drive shaft assembly.

43. A steering system as claimed in claim 40 in which the steering mechanism includes a substantially vertically arranged steering shaft mounting the single drive shaft assembly and in which the means for detecting movement of the vehicle out of in-line travel includes pivot sensing means for the steering shaft.

44. A steering system as claimed in claim 40 in which the steering mechanism includes a substantially vertically arranged steering shaft mounting the single drive shaft assembly and in which the means for detecting movement of the vehicle out of in-line travel includes pivot sensing means for the steering shaft and in which the pivot sensing means comprises a pair of electrical switches each connected to a relay for operation of one of the diverter valves and a switch actuator for each switch operable on pivoting of the single wheel drive shaft assembly into a turning mode.

45. A steering system as claimed in claim 40 in which there is a time delay on the operation of the diverter valves on detecting movement of the vehicle out of in-line travel.

46. A steering system as claimed in claim 41 in which the steering mechanism includes a substantially vertically arranged steering shaft mounting the single drive shaft assembly.

47. A steering system as claimed in claim 41 in which the steering mechanism includes a substantially vertically arranged steering shaft mounting the single drive shaft assembly and in which the means for detecting movement of the vehicle out of in-line travel includes pivot sensing means for the steering shaft.

48. A steering system as claimed in claim 41 in which the steering mechanism includes a substantially vertically arranged steering shaft mounting the single drive shaft assembly and in which the means for detecting movement of the vehicle out of in-line travel includes pivot sensing means for the steering shaft and in which the pivot sensing means comprises a pair of electrical switches each connected to a relay for operation of one of the diverter valves and a switch actuator for each switch operable on pivoting of the single wheel drive shaft assembly into a turning mode.

49. A steering system as claimed in claim 41 in which there is a time delay on the operation of the diverter valves on detecting movement of the vehicle out of in-line travel.

50. A steering system as claimed in claim 41 in which the diverter valves open gradually on detecting movement of the single drive shaft assembly out of in-line travel.

51. A steering system as claimed in claim 41 in which the diverter valves deliver the hydraulic fluid through flow-restrictors.

52. A steering system as claimed in claim 41 in which the diverter valves deliver the hydraulic fluid through flow restrictors having orifices mounted in a fluid line fed by the diverter valve.

\* \* \* \* \*